(12) United States Patent
Ji et al.

(10) Patent No.: US 11,953,125 B2
(45) Date of Patent: Apr. 9, 2024

(54) DETACHABLE ANTI-VIBRATION SEALING PROTECTION DEVICE FOR PIPE FLANGE

(71) Applicant: CHANGZHOU UNIVERSITY, Jiangsu (CN)

(72) Inventors: Hong Ji, Changzhou (CN); Yuchen Liu, Changzhou (CN); Ke Yang, Changzhou (CN); Zhixiang Xing, Changzhou (CN); Juncheng Jiang, Changzhou (CN); Yinhan Zhao, Changzhou (CN); Jie Guo, Changzhou (CN); Ting Wang, Changzhou (CN); Wencong Shen, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 0 days.

(21) Appl. No.: 18/321,008

(22) Filed: May 22, 2023

(65) Prior Publication Data

US 2023/0323987 A1 Oct. 12, 2023

Related U.S. Application Data

(63) Continuation of application No. PCT/CN2023/086408, filed on Apr. 6, 2023.

(30) Foreign Application Priority Data

Apr. 7, 2022 (CN) .......................... 202210360761.2

(51) Int. Cl.
*F16L 23/00* (2006.01)
*F16L 55/02* (2006.01)
*F16L 58/18* (2006.01)

(52) U.S. Cl.
CPC ............. *F16L 23/006* (2013.01); *F16L 55/02* (2013.01); *F16L 58/187* (2013.01); *F16L 2201/20* (2013.01)

(58) Field of Classification Search
CPC ....... F16L 23/006; F16L 55/02; F16L 58/187; F16L 2201/20
See application file for complete search history.

(56) References Cited

FOREIGN PATENT DOCUMENTS

| CN | 105972370 A | * | 9/2016 | ............ F16F 7/1005 |
| CN | 111706787 A | | 9/2020 | |

(Continued)

OTHER PUBLICATIONS

International Search Report in PCT/CN2023/086408 dated Jul. 6, 2023, 7 pages.

(Continued)

*Primary Examiner* — Vishal R Sahni
(74) *Attorney, Agent, or Firm* — METIS IP LLC

(57) ABSTRACT

The embodiments of the present disclosure provide a detachable anti-vibration sealing protection device for a pipe flange. The protection device includes a casing, wherein left and right end surfaces of the casing have through holes for the pipeline to pass through, and the casing has an accommodation cavity for placing the flange; a first shock absorption assembly for radial shock absorption of the flange; and a second shock absorption assembly which is installed in a one-to-one correspondence with the flange and is configured for axial shock absorption of the corresponding flange. The first shock absorption assembly and the second shock absorption assembly are installed in the accommodation cavity.

7 Claims, 9 Drawing Sheets

(56) References Cited

FOREIGN PATENT DOCUMENTS

| | | | |
|---|---|---|---|
| CN | 212251392 U | | 12/2020 |
| CN | 213879164 U | | 8/2021 |
| CN | 214699786 U | | 11/2021 |
| CN | 214743627 U | | 11/2021 |
| CN | 113833807 A | | 12/2021 |
| CN | 113833917 A | | 12/2021 |
| CN | 215596656 U | | 1/2022 |
| CN | 114962821 A | | 8/2022 |
| JP | 2002148033 A | | 5/2002 |
| JP | 2015224482 A | | 12/2015 |
| KR | 102251950 B1 | * | 5/2021 |
| KR | 20220158384 A | * | 12/2022 |

OTHER PUBLICATIONS

Written Opinion in PCT/CN2023/086408 dated Jul. 6, 2023, 9 pages.

* cited by examiner

B-B

800

| In response to receiving sensing information collected by an information collection component, determining an estimated failure time of the detachable anti-vibration sealing protection device for the pipe flange based on the sensing information | 810 |

↓

| Generating early warning information in response to the estimated failure time meeting a preset early warning condition | 820 |

FIG. 8

DETACHABLE ANTI-VIBRATION SEALING PROTECTION DEVICE FOR PIPE FLANGE

CROSS-REFERENCE TO RELATED APPLICATIONS

The application is a Continuation of International Patent Application No. PCT/CN2023/086408, filed on Apr. 6, 2023, which claims priority of Chinese Patent Application No. 202210360761.2, filed on Apr. 7, 2022, the entire contents of each of which are incorporated herein by reference.

TECHNICAL FIELD

The present disclosure generally relates to the technical field of shock absorption devices, and in particular, to a detachable anti-vibration sealing protection device for pipe flanges.

BACKGROUND

Flange connections are often used in pipeline transport for, especially, liquids. flanges are sometimes connected to equipment such as water pumps and booster pumps, which causes large vibrations during transport, or large vibrations are caused by road vehicles. In such case, the vibration at the flange connection is very large, causing bolts loosening and misalignment of flanges, and further causing poor sealing, and even leading to leakage accidents. In addition, due to long-term exposure to the air, the flanges may corrode, causing trouble to the later maintenance.

Therefore, it is desirable to provide a detachable anti-vibration sealing protection device for pipe flanges, so as to reduce the vibration at the joints of the pipe flanges, reduce the risk of flange misalignment, and improve the service life of the flanges.

SUMMARY

According to one or more embodiments of the present disclosure, a detachable anti-vibration sealing protection device for a pipe flange is provided. The protection device includes: a casing, left and right end surfaces of the casing have through holes for the pipeline to pass through, and the casing has an accommodation cavity for placing the flange; a first shock absorption assembly is radial shock absorption of the flange; a second shock absorption assembly which is installed in a one-to-one correspondence with the flange, and is configured for axial shock absorption of the corresponding flange; wherein the first shock absorption assembly and the second shock absorption assembly are installed in the accommodation cavity.

In some embodiments, the casing includes an upper casing and a lower casing, upper notches are provided on the left and right end surfaces of the upper casing, lower notches are provided on the left and right end surfaces of the lower casing, the upper notches correspond to the lower notches one by one, the upper notches are butted with the corresponding lower notches to form the through holes.

In some embodiments, the first shock absorption assembly includes shock absorption elastic members, one end of each of the shock absorption elastic members is against the inner wall of the accommodation cavity of the casing, and the other end is against an outer peripheral surface of the flange; and the shock absorption elastic members are radially distributed along the outer peripheral surface of the flange, and the shock absorption elastic members located in the upper casing and the lower casing are symmetrically distributed.

In some embodiments, the second shock absorption assembly includes brackets covered with shock absorption rubber sheets, the brackets are distributed along the circumference of the flange, the brackets are Z-shaped, one end of each of the brackets is fixedly connected to the casing, and the other end of each of the brackets is against an end face of the corresponding flange.

In some embodiments, grooves are provided in the upper notches and the lower notches, sealing rings are installed in the grooves when the protection device is installed on the pipeline, the accommodation cavity is a closed cavity.

In some embodiments, a one-way inlet valve and a one-way outlet valve are installed on the casing, the one-way inlet valve and the one-way outlet valve are arranged diagonally, and the one-way outlet valve is located below the one-way inlet valve.

In some embodiments, a front end surface of the upper casing and a front end surface of the lower casing are both equipped with fixed parts, and the fixed parts on the same side are fixedly connected.

In some embodiments, the fixed parts are filled with fillers, and the fillers are porous iron foam material.

In some embodiments, the accommodation cavity is filled with inert gas.

In some embodiments, the protection device further comprises a vibration monitoring component and a processor; the vibration monitoring component includes a vibration transmission rod and a vibration sensor, one end of the vibration transmission rod is connected to the casing, and the other end of the vibration transmission rod is connected to the vibration sensor for monitoring the vibration of the detachable anti-vibration sealing protection device for the pipe flange; and the processor is configured to: in response to receiving sensing information collected by an information collection component, determine an estimated failure time of the detachable anti-vibration sealing protection device of the pipe flange based on the sensing information; and in response to a determination that the estimated failure time meets a preset early warning condition, generate early warning information, the early warning information including at least one of sound information or image information.

In some embodiments, the vibration transmission rod includes a first vibration transmission rod and a second vibration transmission rod, and the vibration sensor includes a first vibration sensor and a second vibration sensor; the sensing information includes first vibration sensing information generated by the first vibration sensor and second vibration sensing information generated by the second vibration sensor; the first vibration transmission rod is connected to the casing and the first vibration sensor, and is configured to amplify vibration signals; and the second vibration transmission rod is connected to the casing and the second vibration sensor, is configured to reduce the vibration signals.

In some embodiments, the sensing information collected by the information collection component further comprises: image sensing information of the an accumulative vibration collector collected by the information collection component.

In some embodiments, the vibration monitoring component also includes an accumulative vibration collector; the accumulative vibration collector comprises: a particle storage box used for storing several vibration monitoring particles, and among the remaining end faces of the particle storage box except for the bottom end face, wherein at least one end face provided with at least one first through hole; and at least one particle storage chamber, wherein at least one end surface of the particle storage chamber is provided with at least one second through hole among other end surfaces of the particle storage chamber except for a bottom end surface.

In some embodiments, the vibration monitoring particles are metal balls; and the bottom end face of the particle storage chamber is a magnetic end face for absorbing the vibration monitoring particles.

In some embodiments, the information collection component includes at least one of a collection robot and a collection drone; and the information collection component collects the sensing information based on a preset collection strategy, and the preset collection strategy includes: in response to satisfying a preset collection condition, collecting vibration sensing information of the vibration sensor by the information collection component.

In some embodiments, the preset collection strategy further comprises: in response to satisfying the preset collection condition, acquiring image sensing information by performing an image acquisition on the accumulative vibration collector through the information acquisition component; wherein the acquiring image sensing information by performing an image acquisition on the accumulative vibration collector through the information acquisition component comprises taking pictures of at least one particle storage chamber in the accumulative vibration collector and taking the pictures obtained as the image sensing information.

In some embodiments, the determining an estimated failure time of the detachable anti-vibration sealing protection device of the pipe flange based on the sensing information comprises: determining the estimated failure time based on the process of the sensing information by a failure time prediction model, wherein the failure time prediction model is a machine learning model.

In some embodiments, the failure time prediction model includes an embedded layer and a prediction layer, wherein the embedded layer and the prediction layer are machine learning models; the determining an estimated failure time of the detachable anti-vibration sealing protection device of the pipe flange based on the sensing information further comprises: determining a vibration embedding vector through the embedded layer based on the vibration sensing information; and determining the estimated failure time through the prediction layer based on the vibration embedding vector.

In some embodiments, the sensing information also includes image sensing information collected by the information collection component; the failure time prediction model also includes an image recognition layer, wherein the image recognition layer is configured to obtain particle distribution based on the image sensing information; and the input of the prediction layer also includes the particle distribution.

In some embodiments, the input of the prediction layer also includes at least one of a through-hole feature and a space feature.

BRIEF DESCRIPTION OF THE DRAWINGS

The present disclosure is further illustrated in terms of exemplary embodiments. These exemplary embodiments are described in detail according to the drawings. These examples are non-limiting exemplary embodiments, in which like reference numerals represent similar structures, wherein:

FIG. 8 is a flowchart illustrating an exemplary process for failure warning of a detachable anti-vibration sealing protection device for a pipe flange according to some embodiments of the present disclosure;

Figure 1:
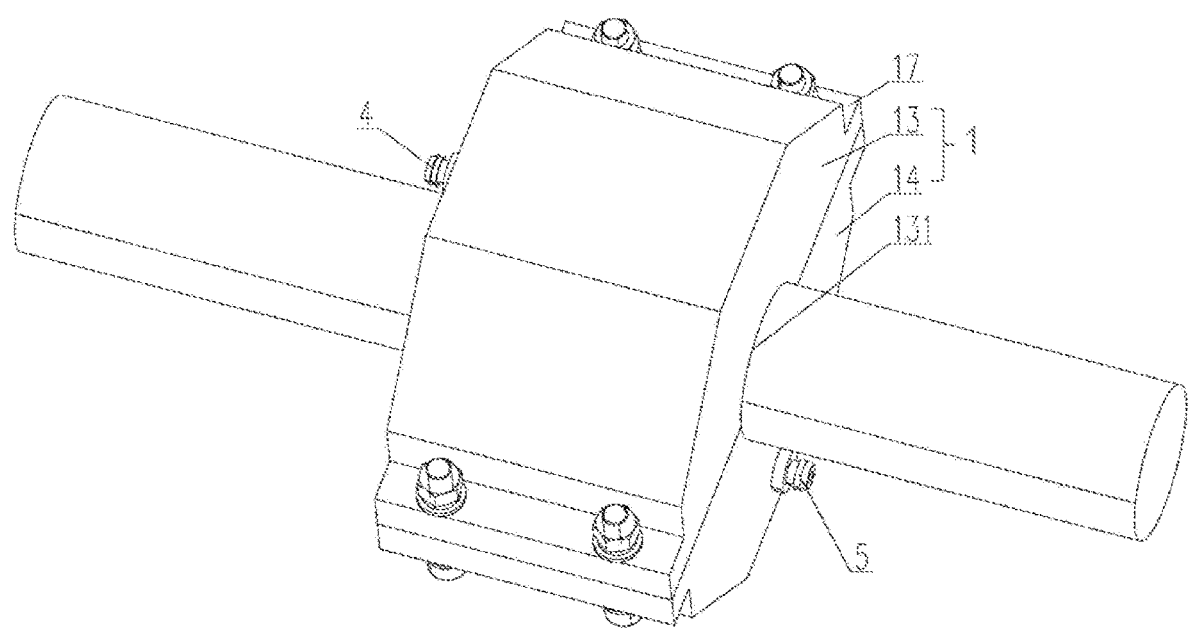
FIG. 1 is a three-dimensional structural schematic diagram of a detachable anti-vibration sealing protection device for a pipe flange according to some embodiments of the present disclosure.

In the figures: 1. a casing; 11. through holes; 12. an accommodation cavity; 13. an upper casing; 14. a lower casing; 131. upper notches; 141. lower notches; 15. grooves; 16. sealing rings; 17. fixed parts; 171. fillers; 2. a first shock absorption component; 21. shock absorption elastic members; 3. a second shock absorption component; 31. brackets; 4. an one-way inlet valve; 5. an one-way outlet valve.

DETAILED DESCRIPTION

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words may be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may further include other steps or elements.

The flowcharts used in the present disclosure illustrate the operation that the system implements according to the embodiment of the present disclosure. It should be understood that the foregoing or following operation may not necessarily be performed exactly in order. Instead, the operation may be processed in reverse order or simultaneously. Besides, one or more other operations may be added to these processes, or one or more operations may be removed from these processes.

Figure 2:
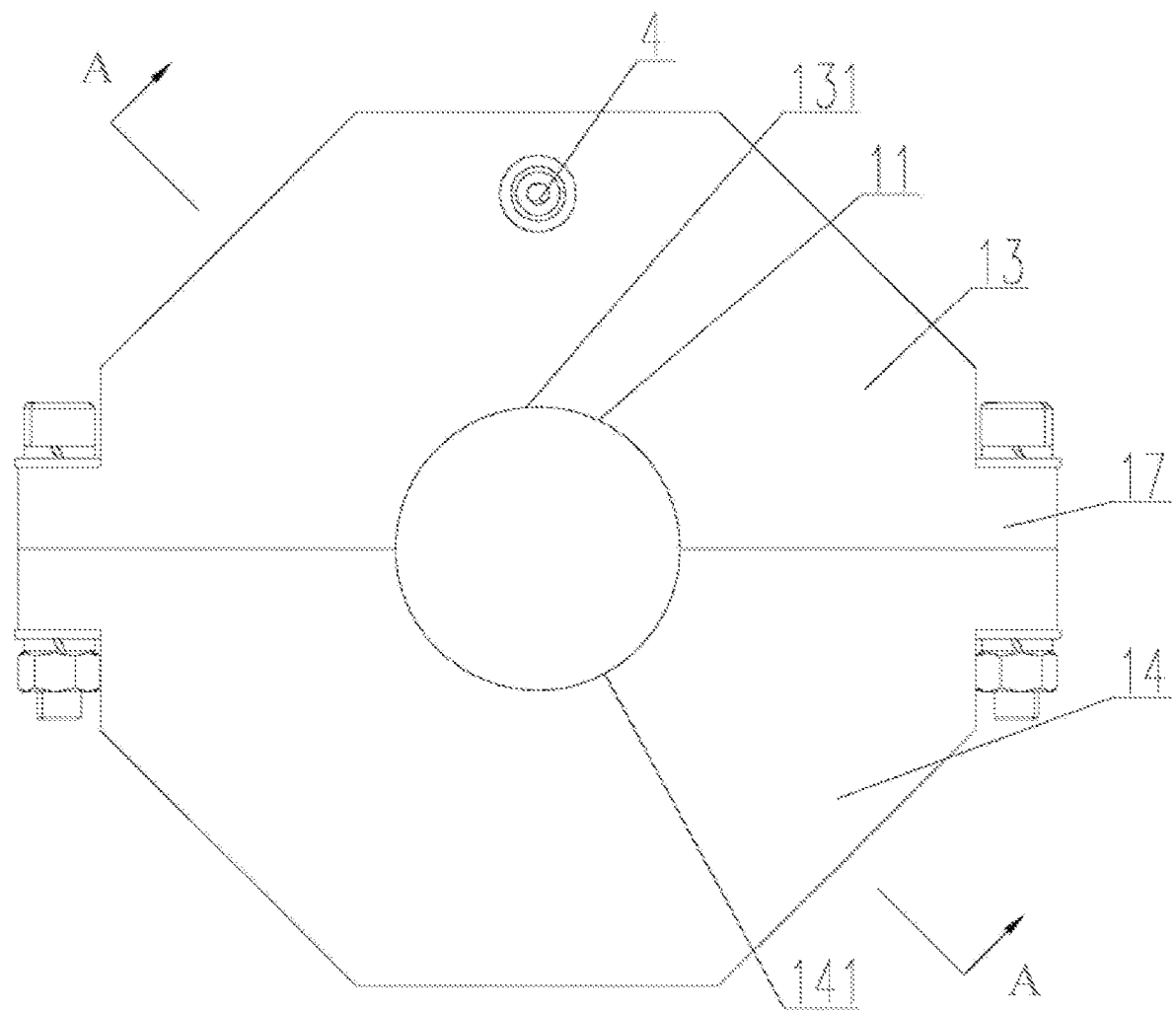
FIG. 2 is a structural schematic diagram of a detachable anti-vibration sealing protection device for a pipe flange from left-view according to some embodiments of the present disclosure.
Figure 3:
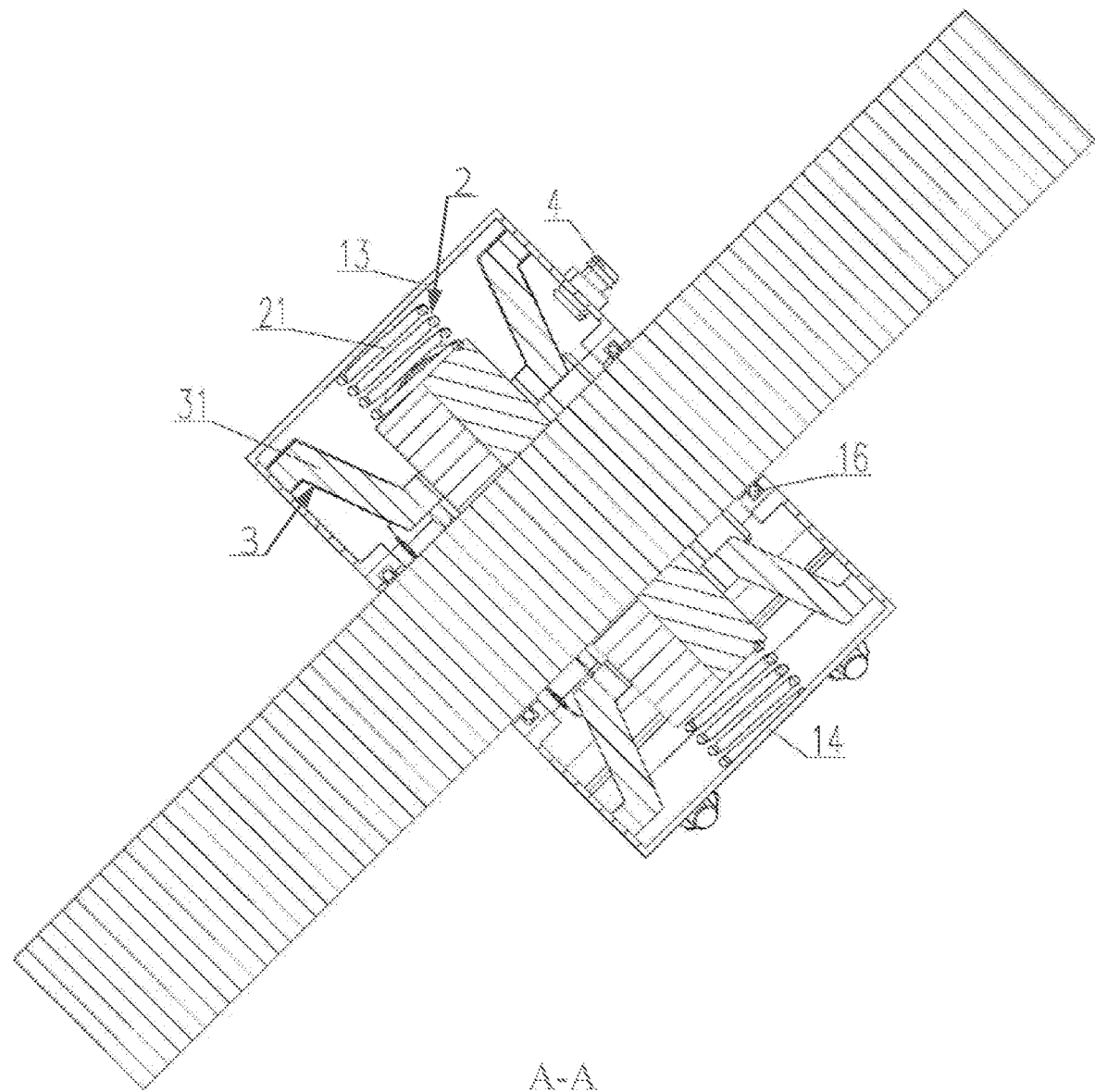
FIG. 3 is a cross-sectional structural schematic diagram of the detachable anti-vibration sealing protection device for a pipe flange along A-A in FIG. 2 according to some embodiments of the present disclosure.

FIG. 1 is a three-dimensional structural schematic diagram of a detachable anti-vibration sealing protection device for a pipe flange according to some embodiments of the present disclosure; FIG. 2 is a structural schematic diagram of a detachable anti-vibration sealing protection device for a pipe flange from left-view according to some embodiments of the present disclosure; FIG. 3 is a cross-sectional structural schematic diagram of A-A in FIG. 2 according to some embodiments of the present disclosure.

As shown in FIGS. 1-3, the embodiments of the present disclosure provide a detachable anti-vibration sealing protection device for a pipe flange (also referred to as protection device), and the protection device may include a casing 1, a first shock absorption assembly 2, and a second shock absorption assembly 3.

The casing 1 can be configured to accommodate or fix other components of the detachable anti-vibration sealing protection device of the pipe flange. In some embodiments, left and right end surfaces of the casing 1 have through holes 11 for the pipeline to pass through. It should be noted that diameters of the through holes 11 may be determined based on a diameter of the pipeline, which is not limited in the present disclosure.

In some embodiments, the casing 1 has an accommodation cavity 12 for placing the flange.

In some embodiments, the accommodation cavity 12 is filled with nitrogen or other inert gas, so that the air in the protection device may be excluded, and a good effect of rust prevention can be achieved.

In some embodiments, the accommodation cavity 12 is installed with the first shock absorption assembly 2 and the second shock absorption assembly 3.

Figure 4:
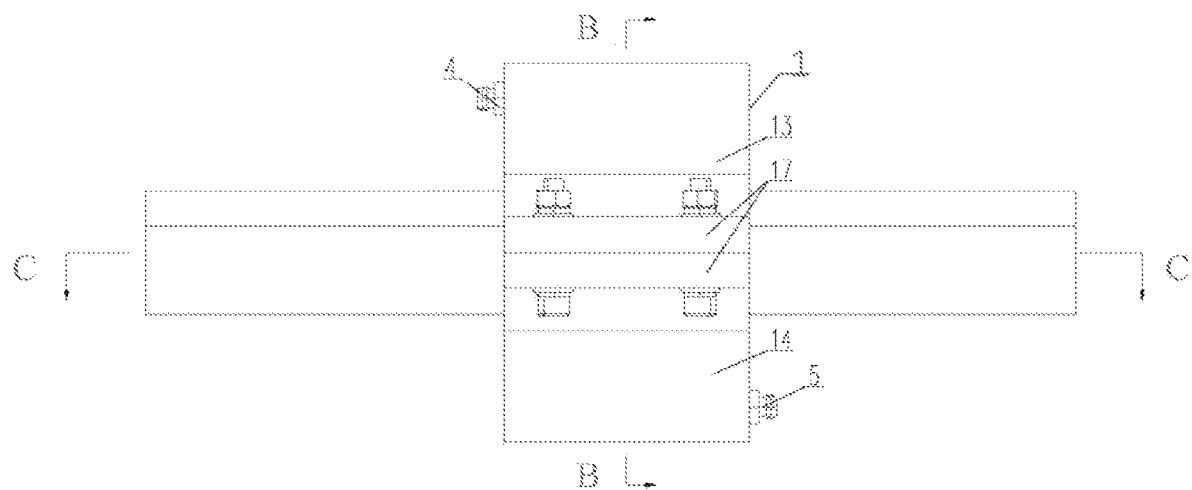
FIG. 4 is a front-view structural schematic diagram of a detachable anti-vibration sealing protection device for a pipe flange according to some embodiments of the present disclosure.
Figure 5:
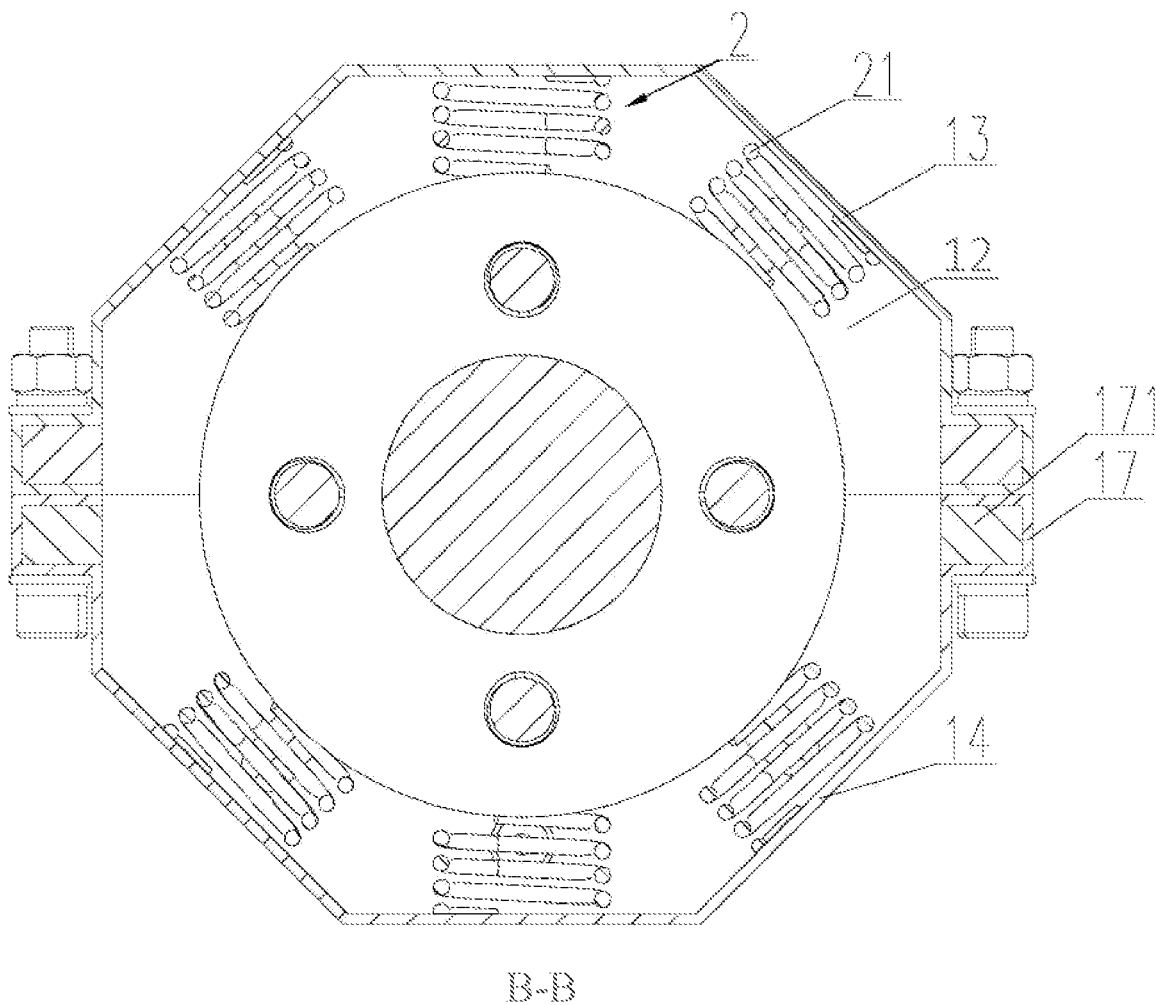
FIG. 5 is a cross-sectional structural schematic diagram of the detachable anti-vibration sealing protection device for a pipe flange along B-B in FIG. 4 according to some embodiments of the present disclosure.
Figure 6:
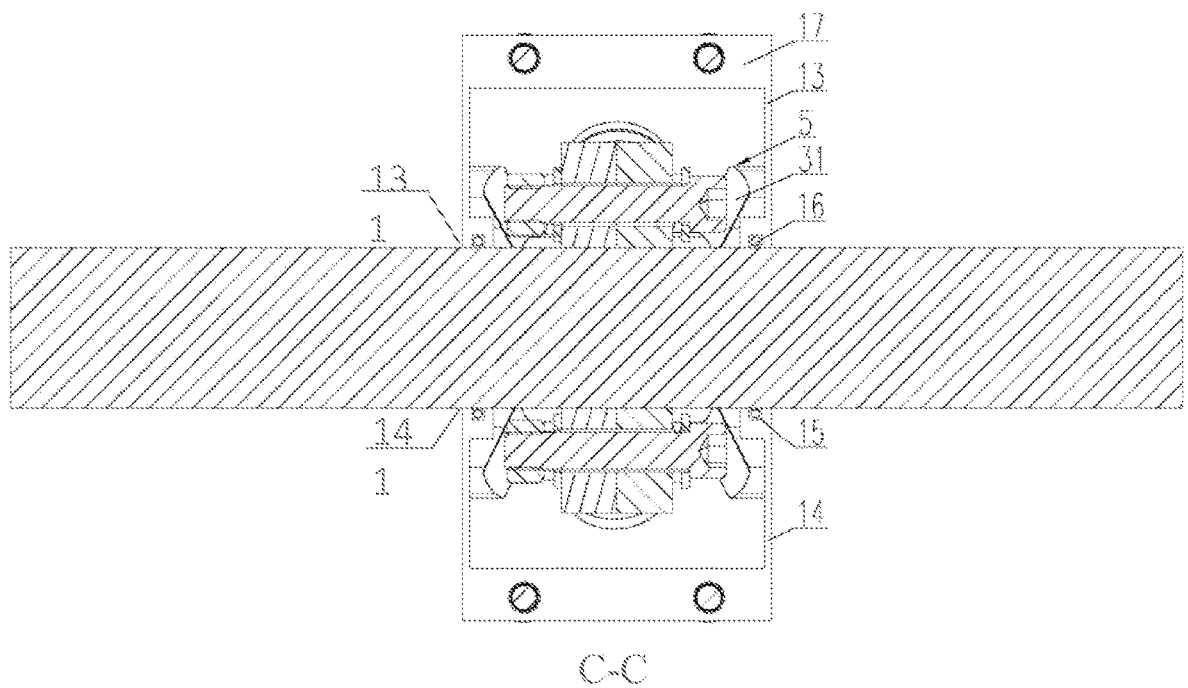
FIG. 6 is a cross-sectional structural schematic diagram of the detachable anti-vibration sealing protection device for a pipe flange along C-C in FIG. 4 according to some embodiments of the present specification.

Further description regarding the casing may be found in FIGS. 4-6 and the related description thereof. Installation manner regarding the first shock absorption assembly and the second shock absorption assembly in the accommodation cavity may be found in FIG. 7 and related descriptions thereof.

The first shock absorption assembly 2 refers to the core component for shock absorption in the detachable anti-vibration sealing protection device of the pipe flange. In some embodiments, the first shock absorption assembly 2 may be configured for the radial shock absorption of the flange. In some embodiments, the "shock" and "vibration" may be interchanged unless expressly stated. In some embodiments, the "shock" may be used in some cases where vibration amplitude, which is the characteristic that describes the severity of the vibration, is relatively large and "vibration" may be used in some cases where vibration amplitude, which is the characteristic that describes the severity of the vibration, is relatively low.

The second shock absorption assembly 3 refers to another core component used for shock absorption in the detachable anti-vibration sealing protection device of the pipe flange. In some embodiments, the second shock absorption assembly 3 in one-to-one correspondence with the flange may be used for axial shock absorption of the corresponding flange.

In some embodiments of the present disclosure, the radial vibration of the pipe flange is absorbed by the first shock absorption assembly 2, and the axial vibration of the pipe flange is absorbed by the second shock absorption assembly 3, which can prevent the misalignment of the flange and greatly improve the service life of the flange.

Figure 7:
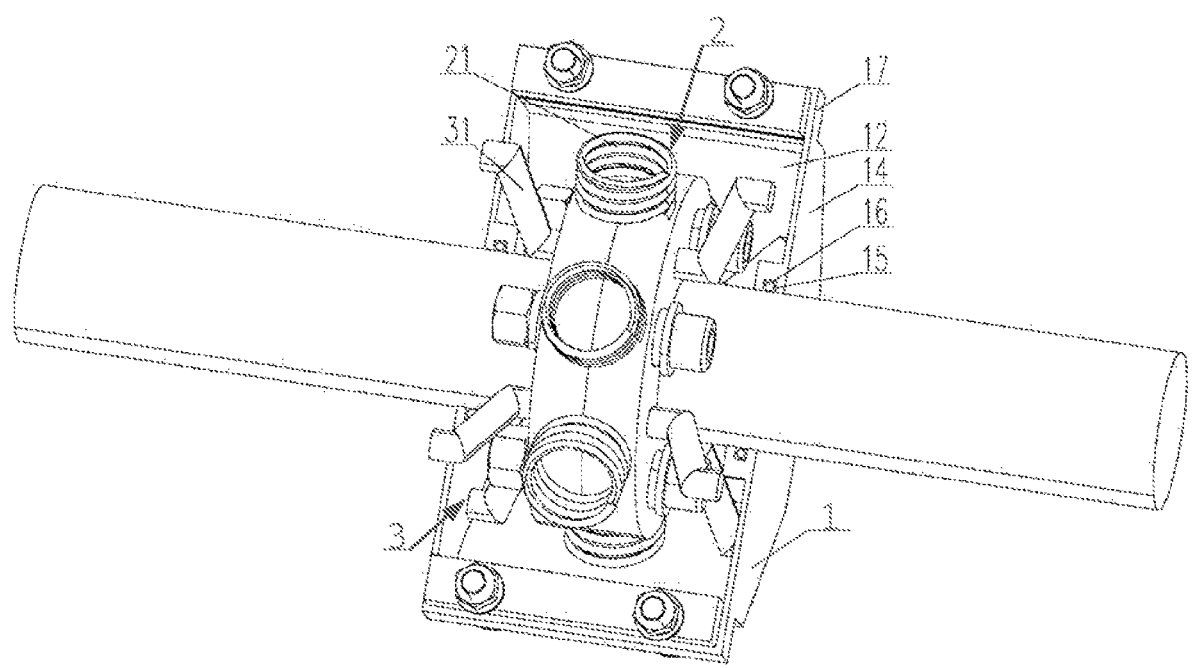
FIG. 7 is a three-dimensional structural schematic diagram of a detachable anti-vibration sealing protection device for a pipe flange without an upper casing according to some embodiments of the present disclosure.

Further description regarding the first shock absorption assembly and the second shock absorption assembly may be found in FIG. 7 and related descriptions thereof.

In some embodiments, the detachable anti-vibration sealing protection device for the pipe flange may also include a vibration monitoring component (not shown in the figure) and a processor (not shown in the figure).

The vibration monitoring component may be configured to monitor the vibration of the detachable anti-vibration sealing protection device of the pipe flange. In some embodiments, the vibration monitoring component may include a vibration transmitting rod and a vibration sensor.

The vibration transmission rod may be configured to transmit a vibration signal of the detachable anti-vibration seal protection device of the pipe flange.

In some embodiments, one end of the vibration transmission rod is connected to the casing 1, and the other end of the vibration transmission rod is connected to the vibration sensor. It should be noted that the manner that the vibration transmission rod is connected to the casing 1 and the vibration sensor is not limited, and the connection manner may be a detachable connection (e.g., threaded connection, etc.) or a non-detachable connection (e.g., welding connection, etc.), which is not limited in the present disclosure.

In some embodiments, the vibration transmission rod may be configured to amplify or reduce the vibration signal to transmit it, or directly transmit it without any change. For example, when the vibration of the protection device is large, the vibration signal may be reduced based on the vibration transmission rod, so as to avoid the vibration signal exceeding the detection threshold of the vibration sensor or distorting the vibration signal; when the vibration of the protection device is small, the vibration signal may be amplified based on the vibration transmission rod to ensure the detection accuracy of the vibration sensor.

In some embodiments, the vibration transmission rod connected to the casing 1 of the protection device may be determined based on factors such as an application scenario where the protection device is located and a transmission effect of the vibration transmission rod on the vibration signal, etc. For example, when the protection device is in an application scenario with a relatively large vibration, the vibration transmission rod connected to the casing 1 of the protection device may be a vibration transmission rod which can reduce the vibration signal; when the protection device is in an application scenario with a small vibration, the vibration transmission rod connected to the casing 1 of the protection device may be a vibration transmission rod which can amplify the vibration signal, etc.

In some embodiments, the vibration transmission rod connected to the casing 1 of the protection device may be determined by means of table lookup. For example, a matching table can be constructed based on the application scenario where the protection device is located and the transmission effect of the vibration transmission rod on the vibration signal, that is, different application scenarios correspond to vibration transmission rods with different transmission effects. When an application scenario of the protection device matches one of the application scenarios in the matching table, its corresponding vibration transmission rod may be quickly determined.

In some embodiments, the transmission effect of the vibration transmission rod on the vibration signal may be understood as an amplification, a reduction or an equivalent transmission of the vibration signal by the vibration transmission rod. Further, the transmission effect may include a multiple of the amplification or the reduction.

It may be understood that when the protection device is in a complex application scenario (such as an irregular vibration, sometimes large and sometimes small, etc.), the protection device may be equipped with a plurality of vibration transmission rods at the same time to amplify or reduce the vibration signal of the protection device. Therefore, the detection accuracy of the vibration sensor may be guaranteed.

In some embodiments, the vibration transmission rod may include a first vibration transmission rod and a second vibration transmission rod. In some embodiments, the vibration sensor may include a first vibration sensor and a second vibration sensor.

The first vibration transmission rod refers to a vibration transmission rod for amplifying the vibration signal. In some embodiments, one end of the first vibration transmission rod is connected with the casing 1, and the other end of the first vibration transmission rod is connected with the first vibration sensor, so as to amplify the vibration signal of the detachable anti-vibration sealing protection device of the pipe flange.

The second vibration transmission rod refers to a vibration transmission rod for reducing the vibration signal. In some embodiments, one end of the second vibration transmission rod is connected with the casing 1, and the other end of the second vibration transmission rod is connected with the second vibration sensor, so as to reduce the vibration signal of the detachable anti-vibration sealing protection device of the pipe flange.

In some embodiments, the first vibration transmission rod and the second vibration transmission rod may be interchanged, that is, the first vibration transmission rod may be configured to reduce the vibration signal, and the second vibration transmission rod may be configured to amplify the vibration signal. In some embodiments, the first vibration transmission rod and the second vibration transmission rod may be the same vibration transmission rod for amplifying, reducing the vibration signal, or transmitting the vibration signal equivalently.

The vibration sensor refers to a detection device that can convert the vibration signal into an electrical signal. For example, the vibration sensor may include an eddy current sensor, an inductive vibration sensor, a capacitive vibration sensor, etc.

In some embodiments, the vibration sensor is provided correspondingly to the vibration transmission rod, that is, one vibration sensor is provided corresponding to one vibration transmission rod to detect the vibration signal.

The first vibration sensor refers to a vibration sensor connected with the first vibration transmission rod. In some embodiments, the first vibration sensor may be configured to generate first vibration sensing information.

The second vibration sensor refers to a vibration sensor connected with the second vibration transmission rod. In some embodiments, the second vibration sensor may be configured to generate second vibration sensing information.

The first vibration sensing information and the second vibration sensing information may be collectively referred to as the vibration sensing information. Further description regarding the first vibration sensing information and the second vibration sensing information may be found in FIG. 8 and related descriptions.

In some embodiments, the vibration sensor can automatically upload the vibration sensing information to the information collection component. In some embodiments, the vibration sensor may further include a memory for storing the vibration sensing information. The information collection component can acquire the vibration sensing information based on the memory of the vibration sensor.

Detailed descriptions regarding the information collection component may be found in FIG. 1 and descriptions thereof.

In some embodiments, the vibration monitoring component may also include an accumulative vibration collector (not shown in the figure).

The accumulative vibration collector may be configured to reflect a comprehensive vibration situation of multiple vibrations of the detachable anti-vibration sealing device of the pipe flange. In some embodiments, the accumulative vibration collector may include a particle storage box and at least one particle storage chamber.

The particle storage box may be configured to store several vibration monitoring particles. In some embodiments, among the remaining end faces of the particle storage box except for the bottom end face, there is at least one end face provided with one or more first through holes.

In some embodiments, the structure and size of the particle storage box are not limited and may be determined based on methods such as experiments, simulations, etc.

The first through hole refers to a hole for the vibration monitoring particles to pass through at least one end surface of the particle storage box. In some embodiments, the size and shape of the first through hole are not limited, and may match the size and shape of the vibration monitoring particle.

In some embodiments, the number and arrangement of the first through holes are not limited and may be determined based on methods such as experiments, simulations, etc. The arrangement of the first through hole may include but is not limited to which end face of the particle storage box the first through hole is arranged on, the array of the first through hole, etc.

The vibration monitoring particles refer to particles stored in the particle storage box and capable of passing through the first through hole. In some embodiments, the number of vibration monitoring particles may be multiple, and the specific number may be determined based on methods such as experiments, simulations, etc.

Materials, structures, and sizes of the vibration monitoring particles are not limited, as long as the vibration monitoring particles can pass through the first through hole smoothly under a preset vibration condition. The preset vibration condition may refer to a preset vibration condition, including but not limited to a preset vibration amplitude, a vibration frequency, etc.

In some embodiments, the vibration monitoring particles are metal balls. For example, iron balls, nickel balls, etc.

The particle storage chamber may be configured to store the vibration monitoring particles passing through the first through hole. In some embodiments, among the remaining end faces of the particle storage chamber except for the bottom end face, there is at least one end face provided with one or more second through holes.

In some embodiments, the number of particle storage chamber may be N, and N may be determined based on methods such as experiments, simulations, etc. The one or more particle storage chambers may be configured to count a particle distribution of the vibration monitoring particles, which may help better reflect the vibration situation of the protection device.

Figure 9:
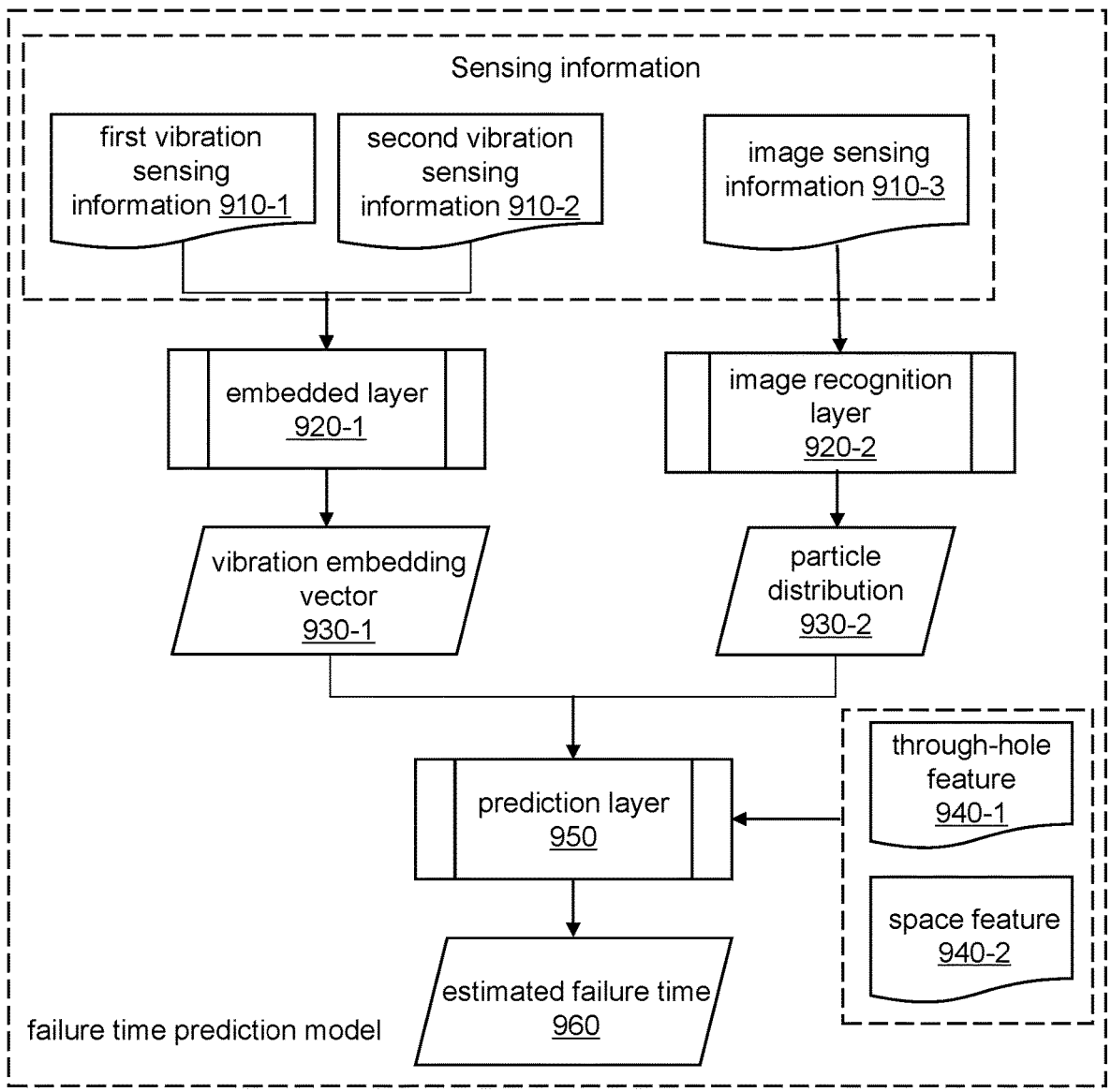
FIG. 9 is a schematic diagram illustrating an exemplary failure time prediction model according to some embodiments of the present disclosure.

Detailed descriptions regarding the particle distribution may be found in FIG. 9 and related descriptions.

In some embodiments, the structure and size of the particle storage chamber are not limited, and may also be determined based on methods such as experiments, simulations, etc. to better cooperate with the particle storage box and monitor the vibration situation of the protection device.

In some embodiments, the particle storage chamber and the particle storage box may be of an integral structure. For example, the particle storage chamber and the particle storage box may be of the integral structure based on an injection molding, etc.; The particle storage chamber and the particle storage box may also be of a split structure. For example, the particle storage chamber and the particle storage box may be combined based on welding, bonding, etc.

The second through hole refers to a hole for the vibration monitoring particles to pass through at least one end surface of the particle storage chamber. Similarly, the size and shape of the second through hole may also match the size and shape of the vibration monitoring particles; the number and arrangement of the second through hole may also be determined based on methods such as experiments, simulations, etc.

In some embodiments, the vibration monitoring particles are metal balls, and the bottom end face of the particle storage chamber is a magnetic end face which may be configured to absorb the vibration monitoring particles, so as to prevent the vibration monitoring particles in the particle storage chamber from returning to the particle storage box by passing through the first through hole from the second through hole due to a vibration, so that the accuracy of vibration data reflected by the accumulative vibration collector can be effectively guaranteed.

In some embodiments, the accumulative vibration collector may also include a casing, and at least one end face of the casing may be a transparent end face. By designing at least one end face (for example, the front end face) of the casing as a transparent end face, it is convenient for the information collection component to collect information on the accumulative vibration collector.

The casing can be configured to install the particle storage box and the particle storage chamber. It should be noted that a specific installation position of the particle storage box and the particle storage chamber in the casing may be determined based on methods such as experiments, simulations, etc., and the present disclosure does not limit it.

In some embodiments, when the protection device vibrates, the vibration may cause the vibration monitoring particles in the particle storage box to pass through the first through hole and enter one or more particle storage chambers through the second through hole. It may be understood that when the protection device vibrates more times or the vibration amplitude is greater, theoretically, the vibration monitoring particles entering one or more particle storage chambers may be of larger quantities and more dispersed. In this way, the comprehensive vibration situation of multiple vibrations of the protection device may be intuitively learned, which is beneficial for the subsequent determination of an estimated failure time.

The processor may process data and/or information obtained from other devices. The processor may execute a program instruction based on the data, information, and/or processing result to perform one or more of the functions described in the present disclosure. In some embodiments, a processor 120 may include one or more sub-processing devices (e.g., a single-core processing device or a multi-core processing device). For example, the processor 120 may include a Central Processing Unit (CPU), an Application Specific Integrated Circuit (ASIC), etc.

In some embodiments, the processor is configured to, in response to receiving sensing information collected by the information collection component, determine the estimated failure time of the detachable anti-vibration sealing protection device of the pipe flange based on the sensing information, and in response to the estimated failure time meeting the preset early warning condition, generate early warning information. Detailed descriptions regarding the above content may be found in FIG. 8 and related descriptions.

The information collection component may be configured to collect the sensing information generated by the vibration monitoring component and transmit the sensing information to the processor.

In some embodiments, the information collection component may be integrated within the processor, and the processor may obtain the sensing information through the information collection component. For example, the processor may control the information collection component to obtain the sensing information by sending a control instruction to the information collection component; as another example, the vibration sensor may automatically send the vibration sensing information to the information collection component, and the processor obtains the vibration sensing information by retrieved it from the information collection component.

In some embodiments, the information collection component may include one or more of a collection robot and a collection drone.

In some embodiments, the processor may obtain the sensing information based the one or more of a collection robot and a collection drone. For example, the processor may obtain image sensing information of the accumulative vibration collector based on the collection robot or the collection drone.

Further descriptions regarding the obtaining of the sensing information by the information collection component may be found in FIG. 8 and related descriptions.

In some embodiments, the vibration monitoring component may also have other structures, which are not limited in the present disclosure. For example, the vibration monitoring component may include a swing rod structure, and the vibration condition of the protection device, etc. is determined based on the offset of the swing rod.

FIG. 4 is a structural diagram of a detachable anti-vibration sealing protection device for a pipe flange from a front-view according to some embodiments of the present disclosure; FIG. 5 is a cross-sectional structural schematic diagram of the detachable anti-vibration sealing protection device for a pipe flange along B-B in FIG. 4 according to some embodiments of the present disclosure; FIG. 6 is a cross-sectional structural schematic diagram of the detachable anti-vibration sealing protection device for a pipe flange along C-C in FIG. 4 according to some embodiments of the present disclosure.

As shown in FIGS. 4-6, the casing 1 may include an upper casing 13 and a lower casing 14.

The upper casing 13 refers to the upper half of the casing 1. In some embodiments, upper notches 131 are formed on the left and right end surfaces of the upper casing 13. The upper notches 131 refer to arc-shaped grooves arranged on the upper casing 13 and adapted to the shape and size of the pipeline.

The lower casing 14 refers to the lower half of the casing 1. In some embodiments, lower notches 141 are also formed on the left and right end surfaces of the lower casing 14. The lower notches 141 refer to arc-shaped grooves arranged on the lower casing 14 and adapted to the shape and size of the pipeline.

In some embodiments, the upper notches 131 and the lower notches 141 are in one-to-one correspondence, and the upper notches 131 and the corresponding lower notches 141 are butted to form through holes 11 for the pipeline to pass through.

In some embodiments of the present disclosure, the installation of the protection device may be more convenient by designing the casing as a split structure.

As shown in FIG. 6, grooves 15 are provided in the upper notches 131 and the lower notches 141, and sealing rings 16 are installed in the grooves 15. When the protection device is installed on the pipeline, the accommodation cavity 12 is a closed cavity, which makes the whole protection device completely sealed.

The grooves 15 refer to grooves for installing the sealing rings 16. In some embodiments, the structure and size of the grooves 15 may be determined based on the structure and size of the sealing rings 16.

The sealing rings 16 refer to annular rings composed of one or several parts. The material of the sealing rings 16 include but not limited to Isobutylene-isoprene (IIR) butyl rubber sealing rings, Neoprene® (CR) sealing rings, etc.

In some embodiments, when the protection device is installed on the pipeline, the sealing rings 16 may be in close contact with the pipeline, so that the accommodation cavity 12 may become the closed cavity and the entire protection device may be completely sealed, thereby preventing components in the accommodation cavity 12 from contacting with the outside air to avoid rust, then reducing later maintenance costs.

As shown in FIG. 4, a one-way outlet valve 4 and a one-way outlet valve 5 are installed on the casing 1, the one-way outlet valve 4 and the one-way outlet valve 3 are arranged diagonally, and the one-way outlet valve 5 is located below the one-way air inlet valve 4.

The one-way inlet valve 4 refers to a valve for feeding an inert gas into the accommodation cavity 12.

The one-way outlet valve 5 refers to a valve for discharging gas from the accommodation cavity 12.

In some embodiments, when the protection device is installed on the pipeline, the accommodation cavity 12 is a closed cavity, at this time, the one-way inlet valve 4 and the one-way outlet valve 5 may be opened. The one-way inlet valve 4 may be configured to feed the inert gas (such as nitrogen, etc.) into the accommodation cavity 12, and the one-way outlet valve 5 may be configured to discharge the gas (such as air or a mixture of air and inert gas, etc.) in the accommodation cavity 12. After feeding the inert gas for a period of time, the one-way inlet valve 4 and the one-way outlet valve 5 may be closed to ensure that the gas in the accommodation cavity 12 is the inert gas, so as to prevent the components (such as flanges, etc.) in the accommodation cavity 12 from rusting. It should be noted that the time for feeding the inert gas may be determined based on historical data and other methods.

In some embodiments of the present disclosure, the one-way inlet valve and the one-way outlet valve are arranged diagonally on the casing, and the one-way outlet valve is arranged below the one-way inlet valve, which is more conducive to the discharge of the air in the accommodation cavity so that flanges, shock absorption components and other components can be more effectively prevented from rusting.

As shown in FIGS. 4-5, fixed parts 17 are installed on a front end surface of an upper casing 13 and a front end surface of a lower casing 14, and the fixed parts 17 on the same side are fixedly connected.

The fixed parts 17 refer to components for fixing the upper casing 13 and the lower casing 14. For example, the fixed parts 17 may be bolts, nuts, buckles, etc.

A fixed connection is a connection in which there is no relative movement after parts or components are fixed. The fixed connection may include a detachable connection (such as a threaded connection, a snap connection, etc.) and a non-detachable connection (such as a welded connection, a rivet connection, etc.).

In some embodiments, the fixed parts 17 on the same side may be fixedly connected by threaded connectors (such as bolts and nuts, etc.). When the shock absorption effect of the protection device is abnormal, the casing 1 may be opened by removing the threaded connectors to check, repair or replace the component(s) in the accommodation cavity 12 in time, so as to avoid replacement of the entire protection device and reduce later maintenance costs.

As shown in FIG. 5, the fixed parts 17 are filled with fillers 171.

The fillers 171 refer to materials filled inside the fixed parts 17. The type of fillers 171 is not limited, including but not limited to porous metal foam materials, elastic parts, etc. As a preference example, the fillers 171 are mostly of the porous iron foam materials.

In some embodiments of the present disclosure, by filling the fillers 171 in the fixed parts 17, it is beneficial for the shock absorption at the joint between the upper casing 13 and the lower casing 14.

FIG. 7 is a three-dimensional structural schematic diagram of a detachable anti-vibration sealing protection device for a pipe flange without an upper casing according to some embodiments of the present disclosure.

As shown in FIG. 7, the first shock absorption assembly 2 may include shock absorption elastic members 21.

The shock absorption elastic members 21 refer to elastic parts for shock absorption, including but not limited to shock absorption springs, etc.

In some embodiments, one end of each of the shock absorption elastic members 21 is against an inner wall of the accommodation cavity 12 of the casing 1, and the other end of each of the shock absorption elastic members 21 is against an outer peripheral surface of the flange. The shock absorption elastic members 21 are radially distributed along the outer peripheral surface of the flange, and the shock absorption elastic members 21 located in the upper casing 13 and the shock absorption elastic members 21 located in the lower casing 14 are distributed symmetrically.

In some embodiments, two ends of each of the shock absorption elastic members 21 may be fixedly connected to the inner wall of the accommodation cavity 12 and the outer peripheral surface of the flange respectively, and the shock absorption elastic members 21 are radially distributed along the outer peripheral surface of the flange, so as to realize radial shock absorption of the flange. As a preference, one end of each of the shock absorption elastic members 21 may be connected to the inner wall of the accommodation cavity 12 by spot welding through a welding rod, and the other end of each of the shock absorption elastic members 21 may be connected to the flange by welding. The height of the shock absorption elastic members 21 is advisable to just press against the outer peripheral surface of the flange.

In some embodiments, the shock absorption elastic members 21 are distributed symmetrically, and the number of the shock absorption elastic members 21 is not limited (e.g., 1, 3, 5, etc.), which may be determined based on actual conditions. Specifically, based on different vibration conditions of application scenarios of the protection device, the number of the shock absorption elastic members 21 may be increased or decreased accordingly, so as to reduce the manufacturing cost while achieving radial shock absorption on the flange.

As shown in FIG. 7, the second shock absorption assembly 3 includes brackets 31 covered with shock absorption rubber sheets.

The brackets 31 refer to parts for shock absorption. In some embodiments, the brackets 31 are at least partially covered with the shock absorption rubber sheets for shock absorption. It may be understood that the brackets 31 may also be covered with other materials, as long as meeting the shock absorption function.

In some embodiments, the brackets 31 are distributed along the circumference of the flange, and the brackets 31 are Z-shaped, one end of each of the brackets 31 is fixedly connected to the casing 1, and the other end of each of the brackets 31 is against an end face of the corresponding flange for realizing axial shock absorption of the flange.

In some embodiments, the brackets 31 may also be designed in other structures, such as an N-type, an M-type, a W-type, etc.

In some embodiments, the cross-sectional shape of the Z-shaped brackets 31 covered with the shock absorption rubber sheets may be circular, and the shock absorption rubber sheets are connected to one ends of the Z-shaped brackets 31 in a glued manner and fixed to the end surface of the flange. The other ends of the brackets 31 are connected to the inner wall of the casing cavity 12 of the casing 1 by welding, so as to ensure that the flange maintains balance when vibrating. In addition, the length of the Z-shaped brackets 31 may be properly adjusted according to the thickness of the flange, e.g., s just pressing the end face of the flange.

Similarly, the number of brackets 31 may also be determined based on actual conditions, so as to reduce manufacturing costs while achieving axial shock absorption on the flange.

As shown in FIGS. 1-7, in some embodiments of the present disclosure, when the detachable anti-vibration sealing protection device for the pipe flange is in use, compared with one shock absorption elastic member 21, a plurality of shock absorption elastic members 21 distributed radially and symmetrically along the outer peripheral surface of the flange may absorb vibration by expanding and contracting in different directions when the flange vibrates. At the same time, the shock absorption rubber sheets fixed on the flange by a plurality of Z-shaped brackets 31 further reduce the vibration while firmly pressing the flange, so as to prevent the misalignment of the flange. In addition, because the vibration of the flange may cause the casing 1 to vibrate slightly, the porous iron foam material in the fixed part 17 may also slow down the vibration at this time, preventing a threaded connector (such as a bolt and a nut, etc.) on the casing 1 from loosening and affecting shock absorption effect.

In some embodiments of the present disclosure, the width of a clamping mechanism and the lengths of the shock absorption elastic members 21 and the Z-shaped brackets 31 may be adjusted according to the specification of the flange, so as to optimize the shock absorption effect. In addition, the one-way outlet valve 4 and the one-way outlet valve 5 arranged on the casing may be configured to discharge the air in the protection device by filling inert gas. Moreover, the sealing rings 16 are installed at the connection between the protection device and the pipeline, so that the protection device and the flange are in a completely sealed state, thereby playing a good anti-rust effect on the flange and greatly improving the service life of the flange.

FIG. 8 is a flowchart illustrating an exemplary process for failure warning of a detachable anti-vibration sealing protection device for a pipe flange according to some embodiments of the present disclosure.

As shown in FIG. 8, the process 800 includes step 810 and step 820. In some embodiments, the process 800 may be executed by a processor.

In step 810, in response to receiving sensing information collected by an information collection component, determining an estimated failure time of the detachable anti-vibration sealing protection device for the pipe flange based on the sensing information.

Detailed descriptions regarding the information collection component may be found in FIGS. 1-4 and related descriptions.

The sensing information refers to relevant data for reflecting the vibration of the detachable anti-vibration sealing protection device of the pipe flange.

In some embodiments, the sensing information collected by the information collection component may include first vibration sensing information and second vibration sensing information (i.e., vibration sensing information).

The first vibration sensing information refers to vibration data generated by a first vibration sensor. The second vibration sensing information refers to vibration data generated by a second vibration sensor.

In some embodiments, the vibration sensing information may be time series data. Exemplarily, the vibration sensing information may be a series of vibration data continuously generated by the vibration sensor within a time interval of information collection. The time interval for the information collection may be determined based on various methods, such as historical data, etc.

Further descriptions regarding the first vibration sensor and the second vibration sensor may be found in FIGS. 1-4 and related descriptions.

In some embodiments, the sensing information collected by the information collection component may also include image sensing information of an accumulative vibration collector.

The image sensing information refers to an image obtained by taking pictures of at least one particle storage chamber in the accumulative vibration collector by the information collection component. In some embodiments, the image sensing information may be multiple images taken by the information collection component at a certain moment.

In some embodiments, the image sensing information may be configured to reflect an accumulative feature of multiple vibrations of the detachable anti-vibration sealing protection device of the pipe flange. The accumulative feature may be configured to reflect a feature of multiple vibration superpositions. For example, the accumulative feature may be the total number of the vibration or the total amplitude of the vibration.

Detailed descriptions regarding the accumulative vibration collector may be found in FIGS. 1-4 and related descriptions.

In some embodiments, the information collection component may collect the sensing information based on multiple methods. For example, the vibration sensor may automatically upload the vibration sensing information to the information collection component.

In some embodiments, the information collection component may collect the sensing information based on a preset collection strategy.

The preset collection strategy refers to a preset strategy for collecting the sensing information. In some embodiments, the preset collection strategy may include: in response to satisfying the preset collection condition, the information collection component collects the vibration sensing information of the vibration sensor.

The preset collection condition may include, but is not limited to, that the time interval from the last information collection is not less than an interval threshold.

The interval threshold may be a preset value, an empirical value, an experimental value, etc. In some embodiments, the interval threshold may be adjusted dynamically. For example, the interval threshold may be related to an estimated failure time determined based on the sensing information collected last time. The closer the estimated failure time is to the current time, the smaller the interval threshold may be, so that the information collection component may collect the sensing information more frequently.

The estimated failure time refers to the failure time of the detachable anti-vibration sealing protection device of the pipe flange determined based on the sensing information. Detailed descriptions regarding determining the estimated failure time may be found in other parts (such as FIG. 9).

In some embodiments, in response to the time interval from the last information collection is not less than the interval threshold (that is, the preset collection condition is met), the information collection component may obtain the vibration sensing information from a memory based on the memory of the vibration sensor.

It should be noted that when the information collection component collects the vibration sensing information of the vibration sensor, it may simultaneously collect respective vibration sensing information of a plurality of vibration sensors (for example, the first vibration sensing information, the second vibration sensing information), which makes the vibration monitoring component can applied more widely, and is also conducive for further ensuring the accuracy of the estimated failure time.

In some embodiments, the preset collection strategy may further include: in response to meeting the preset collection condition, the information collection component collects images from the cumulative vibration collector to obtain image sensing information. The image collection may include taking pictures of one or more particle storage chambers in the accumulative vibration collector and using the pictures obtained as the image sensing information.

In some embodiments, in response to the time interval from the last information collection being not less than the interval threshold (that is, the preset collection condition is met), the image sensing information of the accumulative vibration collector is obtained by one or more of collection robots or collection drones taking pictures of one or more particle storage chambers in the accumulative vibration collector.

In some embodiments of the present disclosure, the information collection component collects the sensing information based on the preset collection strategy, which makes the information collection more flexible.

In some embodiments, based on the sensing information, the estimated failure time of the detachable anti-vibration sealing protection of the pipe flange may be determined based on a variety of methods. For example, the estimated failure time of the detachable anti-vibration sealing protection device of the pipe flange may be determined based on looking up a comparison table including a comparison relationship between the sensing information and the estimated failure time.

In some embodiments, the processor may determine the estimated failure time based on a failure time prediction model. Detailed descriptions may be found in FIG. 9 and related descriptions.

In step 820, generating early warning information in response to the estimated failure time meeting a preset early warning condition.

The preset early warning condition refers to a preset condition for failure early warning. The preset early warning condition may include that the estimated failure time does not exceed a failure time threshold, etc. In some embodiments, the failure time threshold may be determined based on historical data or may be determined based on simulations, experiments, etc.

The early warning information refers to relevant information that reminds and warns users in advance. In some embodiments, the early warning information may include one or more of sound information and image information.

The sound information refers to information that reminds and warns users based on sounds, such as alarm sounds.

The image information refers to information that reminds and warns users based on images, such as warning images.

In some embodiments, the early warning information may also be other types of information. For example, text information, etc.

In some embodiments, in response to the estimated failure time meeting the preset early warning condition, the processor may automatically generate the early warning information and send it to an external early warning module (such as a speaker with an alarm function, etc.), for realizing early warning users.

In some embodiments of the present disclosure, determining the estimated failure time of the detachable anti-vibration sealing protection device of the pipe flange based on the sensing information, and in response to the estimated failure time meeting the preset early warning condition, generating the early warning information can realize the monitoring of a shock absorption effect of the protection device, find and solve the problem in time, so as to effectively ensure the shock absorption effect of the protection device and then improve the service life of the flange.

FIG. 9 is a schematic diagram illustrating an exemplary failure time prediction model according to some embodiments of the present disclosure.

In some embodiments, determining the estimated failure time of the detachable anti-vibration sealing protection device of the pipe flange based on the sensing information may include: processing the sensing information based on a failure time prediction model to determine an estimated failure time.

The failure time prediction model refers to the model for determining the estimated failure time. In some embodiments, a failure prediction model is a machine learning model. For example, the failure prediction model may be a recurrent neural network (RNN), a long-short term memory network (LSTM), etc., or any combination thereof.

As shown in FIG. 9, the failure time prediction model may include an embedded layer 920-1 and a prediction layer 950. In some embodiments, the embedded layer 920-1 and the prediction layer 950 are machine learning models, such as long short-term memory networks, etc.

In some embodiments, a processor may determine a vibration embedding vector 930-1 through the embedded layer 920-1 based on vibration sensing information. The processor may determine an estimated failure time 960 through the prediction layer 950 based on the vibration embedding vector 930-1. The vibration sensing information may include first vibration sensing information 910-1 and second vibration sensing information 910-2.

Further descriptions regarding the first vibration sensing information and the second vibration sensing information may be found in FIG. 8 and related descriptions.

In some embodiments, the failure time prediction model may also include an image recognition layer 920-2. In some embodiments, the image recognition layer 920-2 is a machine learning model, such as a convolutional neural network, etc.

In some embodiments, the image recognition layer 920-2 may be configured to obtain particle distribution 930-2 based on the image sensing information 910-3.

The particle distribution 930-2 refers to the distribution of the number of vibration monitoring particles in the particle storage box and one or more particle storage chambers. In some embodiments, particle distribution 930-2 may be represented based on a vector format. For example, the vector (a, b1, b2, . . . , bn), represented as the number of particles of the vibration monitoring particles in the particle storage box is a; the number of vibration monitoring particles in the first particle storage chamber is b1; the number of vibration monitoring particles in the second particle storage chamber is b2; the number of vibration monitoring particles in the Nth particle storage chamber is bn.

It may be understood that the smaller the number of vibration monitoring particles in the particle storage box, the more average the number of vibration monitoring particles in one or more particle storage chambers (i.e., the more dispersed the vibration monitoring particles), then it may be considered that the more obvious an accumulative feature of a plurality of vibrations of the protection device, such as the greater the total number of vibrations or the greater the total amplitude of vibrations.

In some embodiments, the input of the prediction layer 950 may also include the particle distribution 930-2.

In some embodiments of the present disclosure, the failure time prediction model may also include an image recognition layer, through which the particle distribution is obtained, and input the particle distribution to the prediction layer. The accumulative feature of multiple vibrations of the protection device may be considered in the process of determining the estimated failure time, thereby making the prediction result of the model more accurate.

In some embodiments, the input of the prediction layer 950 may also include one or more of a through-hole feature 940-1 and a space feature 940-2.

The through-hole feature 940-1 may include a first through-hole feature and a second through-hole feature. Further, the first through-hole feature may include a number and a diameter of the first through hole. The second through-hole feature may include a number and a diameter of the second through hole. Detailed descriptions regarding the first through hole and the second through hole may be found in FIGS. 1-3 and related descriptions.

The space feature 940-2 may include a size of the particle storage box and a size of the particle storage chamber.

It may be understood that under the same vibration condition (such as vibration times, vibration amplitudes, etc.), different through-hole features 940-1 and space features 940-2 have different effects on the particle distribution 930-2. For example, as the diameter of the first through hole increases, the amount of vibration monitoring particles entering one or more particle storage chambers may increase accordingly.

In some embodiments of the present disclosure, the input of the prediction layer may also include a through-hole feature and a space feature, which may allow the model further consider the influence of the through-hole feature and the space feature in the process of determining the estimated failure time, so that the prediction accuracy of the model may be further improved.

In some embodiments, a training sample of the failure time prediction model may include a sample first vibration sensing information, a sample second vibration sensing information, a sample image sensing information, a sample through-hole feature, and a sample space feature of a sample detachable anti-vibration sealing protection device of the pipe flange. In some embodiments, the training sample may be obtained based on historical data.

In some embodiments, a label of the training sample is an actual failure time of the sample detachable anti-vibration sealing protection device of the pipe flange. In some embodiments, the label may be obtained based on manual labeling or other methods.

In some embodiments, the embedded layer 920-1, the image recognition layer 920-2, and the prediction layer 950 may be obtained through a joint training. Exemplarily, the sample first vibration sensing information and the sample second vibration sensing information may be input to an initial embedded layer to obtain the vibration embedding vector output by the initial embedded layer. At the same time, the sample image sensing information is input to an initial image recognition layer to obtain the particle distribution output by the initial image recognition layer. Then, the vibration embedding vector output by the initial embedded layer, the particle distribution, the sample through-hole feature, and the sample space feature output by the initial image recognition layer are input to the initial prediction layer to obtain the estimated failure time output by an initial prediction layer. Finally, the value of the loss function is determined based on the difference between the label and the estimated failure time output by the initial prediction layer, and parameters of the initial embedded layer and the initial image recognition layer are updated synchronously. A trained embedded layer 920-1, the image recognition layer 920-2, and the prediction layer 950 are obtained by updating the parameters.

In some embodiments of the present disclosure, the estimated failure time may be quickly and accurately determined by processing the sensing information through a trained failure time prediction model. In addition, in the process of determining the estimated failure time, the failure time prediction model comprehensively considers the influence of the particle distribution, the through-hole feature and the space feature, which can effectively improve the prediction accuracy of the model and ensure the accuracy of the estimated failure time.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and modifications are intended to be suggested by the present disclosure and are within the spirit and scope of the exemplary embodiments of this disclosure.

Moreover, certain terminology has been used to describe embodiments of the present disclosure. For example, the terms "one embodiment", "an embodiment", and/or "some embodiments" mean that a particular feature, structure or feature described in connection with the embodiment is included in at least one embodiment of the present disclosure. Therefore, it is emphasized and should be appreciated that two or more references to "an embodiment" or "one embodiment" or "an alternative embodiment" in various parts of the present disclosure are not necessarily all referring to the same embodiment. In addition, some features, structures or features in the present disclosure of one or more embodiments may be appropriately combined.

Furthermore, the recited order of processing elements or sequences, or the use of numbers, letters, or other designations thereof, is not intended to limit the claimed processes and methods to any order except as may be specified in the claims. Although the above disclosure through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various feature is sometimes grouped together in a single embodiment, figure, or description thereof for the purpose of streamlining the disclosure aiding in the understanding of one or more of the various embodiments. However, this disclosure does not mean that the present disclosure object requires more features than the feature mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about", "approximate" or "substantially". For example, "about", "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications, and other material such as articles, books, specifications, publications, documents, things, and/or the like, referenced herein is hereby incorporated by this reference in its entirety for all purposes. Excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition and/or the use of a term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A detachable anti-vibration sealing protection device for a pipe flange, comprising:
   a casing, wherein left and right end surfaces of the casing have through holes for pipelines to pass through, the casing has an accommodation cavity for placing a flange;
   a first shock absorption assembly for radial shock absorption of the flange;
   a second shock absorption assembly which is installed in a one-to-one correspondence with the flange, and is configured for axial shock absorption of the flange; wherein the first shock absorption assembly and the second shock absorption assembly are installed in the accommodation cavity;
   a vibration monitoring component, wherein the vibration monitoring component includes a vibration transmission rod, a vibration sensor, and an accumulative vibration collector, one end of the vibration transmission rod is connected to the casing, and the other end of the vibration transmission rod is connected to the vibration sensor for monitoring the vibration of the detachable anti-vibration sealing protection device for the pipe flange, wherein the accumulative vibration collector comprises:
      a particle storage box used for storing several vibration monitoring particles, wherein at least one end face of the particle storage box provided with at least one first through hole among remaining end faces of the particle storage box except for a bottom end face; and
      at least one particle storage chamber, wherein at least one end surface of the particle storage chamber is provided with at least one second through hole among other end surfaces of the particle storage chamber except for a bottom end surface; and
   a processor, wherein the processor is configured to:
      in response to receiving sensing information collected by an information collection component, determine an estimated failure time of the detachable anti-vibration sealing protection device for the pipe flange based on the sensing information; and in response to a determination that the estimated failure time meets a preset early warning condition, generate early warning information, the early warning information including at least one of sound information or image information;

wherein the vibration transmission rod includes a first vibration transmission rod and a second vibration transmission rod, and the vibration sensor includes a first vibration sensor and a second vibration sensor; and the sensing information includes first vibration sensing information generated by the first vibration sensor and second vibration sensing information generated by the second vibration sensor;

the first vibration transmission rod is connected to the casing and the first vibration sensor, and is configured to amplify vibration signals; and the second vibration transmission rod is connected to the casing and the second vibration sensor, and is configured to reduce the vibration signals.

2. The detachable anti-vibration sealing protection device for the pipe flange of claim 1, wherein the vibration monitoring particles are metal balls; and the bottom end face of the particle storage chamber is a magnetic end face for absorbing the vibration monitoring particles.

3. The detachable anti-vibration sealing protection device for the pipe flange of claim 1, the information collection component includes at least one of a collection robot or a collection drone; and the information collection component collects the sensing information based on a preset collection strategy, and the preset collection strategy includes:

in response to satisfying a preset collection condition, collecting vibration sensing information of the vibration sensor by the information collection component; and in response to satisfying the preset collection condition, acquiring image sensing information by performing an image acquisition on the accumulative vibration collector through the information collection component; and wherein the acquiring image sensing information by performing an image acquisition on the accumulative vibration collector through the information collection component comprises taking pictures of at least one particle storage chamber in the accumulative vibration collector and taking the pictures obtained as the image sensing information.

4. The detachable anti-vibration sealing protection device for the pipe flange of claim 1, wherein the determining an estimated failure time of the detachable anti-vibration sealing protection device for the pipe flange based on the sensing information comprises:

determining the estimated failure time based on the process of the sensing information by a failure time prediction model, wherein the failure time prediction model is a machine learning model.

5. The detachable anti-vibration sealing protection device for pipe flanges according to claim 4, wherein the failure time prediction model includes an embedded layer and a prediction layer, wherein the embedded layer and the prediction layer are machine learning models; and the determining an estimated failure time of the detachable anti-vibration sealing protection device for the pipe flange based on the sensing information further comprises:

determining a vibration embedding vector through the embedded layer based on the vibration sensing information; and determining the estimated failure time through the prediction layer based on the vibration embedding vector.

6. The detachable anti-vibration sealing protection device for the pipe flange of claim 5, wherein the sensing information also includes image sensing information collected by the information collection component; the failure time prediction model also includes an image recognition layer, wherein the image recognition layer is configured to obtain particle distribution based on the image sensing information; and the input of the prediction layer includes the particle distribution.

7. The detachable anti-vibration sealing protection device for the pipe flange of claim 5, wherein the input of the prediction layer also includes at least one of a through-hole feature or a space feature.

* * * * *